United States Patent [19]

Miertschin et al.

[11] 4,056,584

[45] Nov. 1, 1977

[54] METHOD OF MAKING A GRAPHITE FUEL ELEMENT HAVING CARBONACEOUS FUEL BODIES

[75] Inventors: Gary N. Miertschin; David F. Leary, both of San Diego, Calif.

[73] Assignee: General Atomic Company, San Diego, Calif.

[21] Appl. No.: 510,282

[22] Filed: Sept. 30, 1974

[51] Int. Cl.² .............................................. G21C 21/02
[52] U.S. Cl. ................................. 264/.5; 252/301.1 R
[58] Field of Search ...................... 264/.5; 252/301.1 R

[56] References Cited

U.S. PATENT DOCUMENTS

| | | | |
|---|---|---|---|
| 2,968,551 | 1/1961 | North et al. | 264/.5 |
| 3,118,764 | 1/1964 | Hammond et al. | 264/.5 |
| 3,156,747 | 11/1964 | Burke | 264/.5 |
| 3,194,852 | 7/1965 | Lloyd et al. | 264/.5 |
| 3,284,372 | 11/1966 | Bailey | 264/.5 |
| 3,331,897 | 7/1967 | Accury et al. | 264/.5 |
| 3,368,004 | 2/1968 | Sirianni et al. | 264/.5 |
| 3,652,749 | 3/1972 | Sobel et al. | 264/.5 |

FOREIGN PATENT DOCUMENTS

| | | | |
|---|---|---|---|
| 933,500 | 8/1961 | United Kingdom | 176/82 |

*Primary Examiner*—Samuel W. Engle
*Assistant Examiner*—S. A. Cangialosi
*Attorney, Agent, or Firm*—Fitch, Even, Tabin & Luedeka

[57] ABSTRACT

Particulate nuclear fuel material, particulate carbon and pitch are combined with an additive which is effective to reduce the coke yield upon carbonization to mold a green fuel body. The additive may be polystyrene, a styrene-butadiene copolymer, an aromatic hydrocarbon having a molecular weight between about 75 and 300 or a saturated hydrocarbon polymer. The green fuel body is inserted in a complementary cavity within a porous nuclear fuel element body and heated in situ to decompose the pitch and additive, leaving a relatively close-fitting fuel body in the cavity.

10 Claims, No Drawings

METHOD OF MAKING A GRAPHITE FUEL ELEMENT HAVING CARBONACEOUS FUEL BODIES

This invention relates to carbonaceous nuclear fuel bodies and more particularly to methods of making nuclear fuel elements containing a plurality of discrete nuclear fuel bodies, particularly fuel elements designed for use in a high-temperature gas-cooled nuclear reactor.

U.S. Pat. Nos. 3,274,068 (issued Sept. 20, 1967) and 3,413,196 (issued to Nov. 26, 1968) disclose different designs of fuel elements suitable for use in high-temperature gas-cooled nuclear reactors that employ fuel elements formed from a block of refractory material, usually dense graphite, wherein there are a plurality of fuel chambers containing fissile and/or fertile nuclear fuel material. The later patent discloses a fuel element in the form of a large hexagonal block measuring, for example, 15 to 16 inches high and about 14 inches across the flats. Each of these hexagonal fuel elements may contain, for example, about 90 coolant holes and 240 fuel chambers, with the diameters of the fuel chambers being between one-half and three-quarters of an inch.

Such fuel chambers may be filled with packed beds of coated nuclear fuel particles, with a paste made of a mixture of coated fuel particles plus a carbonaceous matrix material, for example, coal tar pitch, or with individual fuel compacts or bodies proportioned to fit therewithin. One method for making nuclear fuel bodies of this general type is disclosed in U.S. Pat. No. 3,558,750 (issued Jan. 26, 1971) wherein mold cavities are filled with coated particles of nuclear fuel and then a molding mixture of carbonaceous binder material is injected under pressure into the mold cavity. The molding mixture may include a suitable organic polymeric resin, for example, a phenolformaldehyde resin, together with a filler, such as graphite or charcoal powder.

It is considered important tht the fuel bodies used in these fuel elements provide both good retention of fission products within the coated particles and good heat transfer of the heat of fission outward to the coolant stream that is being passed in heat exchange therewith. Improvements in these fuel element characteristics are constantly being sought.

It is an object of the present invention to provide an improved molding mixture for making carbonaceous fuel bodies which contain particulate nuclear fuel material. Another object of the invention is to provide a method for making nuclear fuel elements containing a plurality of nuclear fuel bodies disposed in chambers which exhibit good heat transfer and retention of fission products. A further object of the invention is to provide a molding mixture for the formulation, with coated nuclear fuel particles, of green nuclear fuel bodies which can be fired in situ in nuclear fuel element chambers to provide a fuel element having improved operational characteristics. A still further object is to provide a method for molding green fuel bodies containing coated nuclear fuel particles which green bodies are excellently suited for firing in situ within fuel element chambers to produce carbonaceous nuclear fuel bodies having improved reactor performance. These and other objects of the invention will be apparent from a reading of the following detailed description of various molding compositions and methods for making fuel-body-containing fuel elements embodying various features of the invention.

It has been found that a molding mixture can be prepared which, when combined with coated nuclear fuel particles, can be used to make fuel bodies that are excellently suited for use in high temperature nuclear reactors. In addition to the usual components of pitch and a particulate carbon material, such as graphite flour, there is included a coke-reducing additive which, upon the ultimate decomposition and carbonization of it and the pitch, leaves a residue of not more than about 25 weight percent, based upon the weight of the original material molded minus the fuel particles and the particulate carbon.

The invention is considered to be particularly advantageous for use with nuclear fuel particles having outer coatings of pyrolytic carbon or the like. More particularly, the invention is designed for the molding of green fuel sticks or rods which, after being removed from their molds, are fired in situ within the fuel chamber of a refractory material fuel element. It is desirable to have only a small gap between the fuel rod and the interior surface of the fuel chamber so as to maintain as low a fuel temperature as possible by maximizing heat transfer from the fuel outward to the coolant stream, which stream may flow either through coolant passageways in the fuel element block or immediately exterior of the outer surface of the block. However, the closer the exterior fuel rod dimension approaches the interior dimension of the fuel chamber, the greater is the tendency for localized bonding therebetween to occur, and it is undesirable to have any bonding occur between the fuel rod and the inner wall of the fuel element chamber. By reducing the coke yield in the fired fuel rod by the inclusion in the molding composition of a release agent, such as a fairly long chain fatty acid, alcohol or amine, the tendency of such bonding to occur during firing is substantially reduced. Perhaps most important is the performance of the fired fuel body during irradiation. The reduced coke yield results in a substantially weaker bond between the fuel particle coatings and the matrix, which avoids the creation of stress and potential cracking of the fuel particle coatings when the eventual shrinkage of the matrix material under radiation occurs.

More specifically, fuel elements of major concern are those which employ a myriad of minute particles, each of which contains its own fission product-retentive outer coating such as are presently well known in the art. Coated fuel particles of any suitable size may be employed; however, preferably, fuel particles in the range of about 250 microns to about 1,000 microns are generally used. The fuel particle coating may be made up of a series of individual coatings of pyrolytic carbon and refractory carbides, such as silicon carbide and zirconium carbide, the totality of which will serve as a minute pressure vessel to contain the build-up of gaseous fission products which are created during the nuclear fission reactions that occur throughout fuel life.

The particulate carbon which is employed may be activated carbon or charcoal or carbon black, but preferably graphite flour is used. Generally, the particulate carbon will comprise between about 20 percent and 50 percent of the molding mixture, and usually it will be less than about 45 microns in size. Generally, graphite flour less than 40 microns in size is used.

The pitch used may be any of the residual products resulting from the destructive distillation of coal, petroleum, and wood. A pitch is generally used which has softening point of less than about 300° F. and a viscosity between about 100 poise and about 1000 poise, at about 275° F., as measured by an Instron capillary rheometer at a shear rate of 100 sec$^{-1}$. The pitch may comprise up to about 70 percent of the molding mixture, and generally the pitch comprises between about 30 and about 50 percent of the mixture.

Usually, about 5 to 10 weight percent of a release agent is used, which facilitates the removal of the green body from the mold in which it is formed and which also substantially reduces the tendency of the fuel rod to bond to the interior of the fuel chamber during firing. The release agent may be a medium-length carbon chain alcohol or fatty acid, e.g., having a carbon chain between about 12 to 20 carbon atoms. Fatty acid primary amines having a carbon chain between 12 to 26, and saturated petroleum hydrocarbons having a molecular weight between about 350 and 1,400 may be used. Examples of suitable release agents include octadecanol, hexadecanol, oleic acid, stearic acid, octadecylamine, and petrolatum.

As previously indicated, it is the intention to fire the green fuel rod or body in situ within a porous block of refractory material. Generally, the block may be made of any suitable refractory material that will retain its structural strength and dimensional stability at the contemplated operating high-temperature conditions of a nuclear reactor, that has relatively good thermal conductivity and that has good neutron moderating characteristics and a low neutron capture cross section. Preferably, dense graphite is employed. Commercially available artificial graphite having a density between about 1.7 g/cm$^3$ and 1.9 g/cm$^3$ is considered suitable for fuel element production utilizing in situ carbonization of green fuel rods.

The coke-reducing additive is selected from three classes of organic materials. The first class of materials includes polystyrene and copolymers thereof having a molecular weight between about 500 and 1,000,000, and this class is preferred because it not only permits independent control of coke yield, but it also permits the establishment of consistent viscosity over a wide range of temperatures. An example of a suitable copolymer is polystyrene:butadiene, having a mole ratio between about 10 to 1 and about 1 to 1. The second class consists of aromatic hydrocarbon compounds having a molecular weight between about 75 and 300, and examples of such compounds include camphor, naphthalene, anthracene, phenanthrene and dimethyl terephthalate. A mixture of more than one of these compounds may be used. The third class of materials includes saturated hydrocarbon polymers having a molecular weight between about 5,000 and 1,000,000, and examples include polyethylene and polypropylene. Other addition or condensation polymers, both saturated or unsaturated, are also considered to provide at least some of the advantages of the foregoing three classes of compounds.

The combination of pitch plus the coke-reducing additive is more important to the molding mixture. The pitch gives the needed binding strength and dimensional stability to the green fuel rods or sticks; however, it has been found that if pitch alone is employed, there is often a tendency for too strong a bond to be formed between the individual fuel particle coatings and the matrix. Such a strong bond can result in the creation of undesirable stress in the fuel particle coating resulting from the shrinkage of the matrix that occurs during irradiation in the core of a nuclear reactor. The provision of the coke-reducing additive has the effect of weakening the bond between fuel particle coatings and the matrix so that, when irradiation shrinkage of the matrix occurs, stresses of a similar magnitude are not created in the fuel particle coatings. Instead, rupture of the bond between the matrix and the coating occurs.

Additionally, the provision of the coke-reducing additive also has the effect of assuring the formation of a reproducible and quite small gap between the fuel rod and the wall of the fuel hole during the in situ firing. The nature of pitch is such that some swelling occurs during the initial firing of the green fuel rods to produce the fuel bodies, followed by some shrinkage away from the fuel hole walls when the higher temperatures are reached. Without the inclusion of the coke-reducing additives, the final gap between the exterior surface of the fuel stick and the interior wall of the fuel chamber would be about 75 percent of the initial gap between the green fuel stick and the chamber wall. However, the inclusion of the coke-reducing additive has been found to produce shrinkage which is of a reproducible amount, which is less than would occur in the absence thereof, and as a result, the final gap between the exterior surface of the fuel rod and the interior surface of the fuel chamber wall can be held to as little as 25 percent of the gap between the green fuel rod and the chamber wall.

Use of the coke-reducing additive results in being able to narrow the final gap on a consistent basis without forming an undesirable bond between the fuel rod and the chamber wall. To achieve this desirable effect, the coke-reducing additive is included in the molding mixture in an amount between about 5 and about 50 weight percent. Moreover, because of the inter-relationship between the effect of the pitch and the effect of the coke-reducing additive, the coke-reducing additive should be provided in an amount between about 8 percent and 200 percent of the weight of the pitch in the mixture.

Generally, the mold will be filled with coated fuel particles and then the molding mixture injected thereinto. In this instance, the viscosity of the molding mixture assumes more importance and the control afforded by the use of polystyrene or a styrene-butadiene copolymer becomes of significant advantage. Alternatively, the molding mixture may be prepared and suitably granulated beforehand, and then an admixture formed of the coated fuel particles with the molding mixture to produce the molding composition. In either case, the molding mixture is heated to a suitable temperature so that it become fluid, which temperature is usually dictated by the characteristics of the pitch that is used. Generally, the molding temperature will be in the range of about 100° to 300° C. If an admixture is used, it is compressed in the molds under suitable pressure to assure that the molds are full. The molds are generally made of a suitable, strong metallic material, such as stainless steel.

The following examples further illustrate processes utilizing molding mixtures embodying various features of the invention, but it should be understood that these examples in no way constitute limitations upon the invention, the scope of which is defined in the claims appended hereto.

EXAMPLE I

A 600 gram batch of a molding mixture is prepared from coal tar pitch (Ashland Oil No. A240), 45 weight percent; graphite flour, 30 weight percent; octadeconal, as a release agent, 5 weight percent; and camphor, as a coke-reducer, 20 weight percent. The graphite flour has a particle size between about 0.4 micron and about 40 microns. The mixture is blended for about thirty minutes in a sigma blade mixer at a temperature of 200° C. and at a mixing rate of about 100 r.p.m.

After blending, the batch is cooled and then ground and sized to provide particles between about 4.7 mm. and 0.7 mm. Molds made of stainless steel having cavities of right cylindrical shape and a diameter of 0.620 inch (1.57cm.) are filled with particles of nuclear fuel. The nuclear fuel particles contain kernals of uranium-thorium carbide coated with a first layer of porous, spongy pyrolytic carbon and an outer layer of dense isotropiic pyrolytic carbon. The coated fuel particles range in size from between about 1150 microns and about 350 microns.

Each of the molds is then filled with about 20 grams of the coated nuclear fuel particles which is a depth of about 2½ inches. The graphite-filled molding mixture is heated to a temperature to between about 175° C. and 200° C. to fluidize the pitch and is injected into the particle-filled mold cavities using a pressure of about 1,200 p.s.i. Upon completion of injection, the molds are cooled to room temperature to solidify the matrix material, and the green rods are then ejected from the mold.

Graphite cylinders are prepared having an outer diameter of 0.875 inch (1.59 cm.), having a central hole about 0.625 inch (2.22 cm.) in diameter and about 30 inches (76.2 cm.) long. Each cylinder is filled with 12 of the 2½ inch long green fuel rods, and the graphite cylinder is then fired until it reaches a temperature of about 1800° C. over time sufficient to carbonize the pitch, the coke-reducer and the release agent. After cooling, testing shows that the green fuel sticks are fully carbonized. The average gap of the green rods equalled one-half the distance between the outer diameter of the fuel bodies (0.620 in.) and the interior diameter of the fuel chamber (0.625 in.), i.e., originally 0.0025 in. (0.0635 cm.). After firing, the gap changes to about 0.00125 in. (0.0318 cm.). Weighing and examination of the carbonized fuel bodies show that, on the premise that no change in weight occurred with respect to the coated nuclear fuel particles or the graphite powder, the portion thereof originally constituted by the pitch, the coke-reducing additive and the release agent now constitutes about 23 weight percent of the initial weight of these three materials.

Irradiation under simulated reactor conditions shows that fuel elements made in this manner are considered to perform excellently. Accordingly, such fuel elements are considered to be well-suited for use in high-temperature gas-cooled nuclear reactors.

EXAMPLE II

The process of Example I is repeated using 20 weight percent of naphthalene instead of camphor. After carboniziion, the gap is between about 25 and 50 percent of the green gap, and the coke yield is about 25 percent of the original weight of the pitch, plus octadeconal, plus naphthalene. Such fuel elements are considered to be fully acceptable for high-temperature reactor operation.

EXAMPLE III

The process of Example I is repeated using 20 weight percent of anthracene instead of camphor. After firing, the gap is measured and found to be between 25 and 50 percent of the green gap. The resultant coke residue is equal to about 20 weight percent of the amount of pitch, plus anthracene, plus octadeconal in the original molding mixture. Such fuel elements are also considered to be fully acceptable for high-temperature reactor operation.

EXAMPLE IV

The process of Example I is repeated using 20 weight percent of phenanthrene instead of the camphor. Upon firing, the gap is found to be between about 25 percent and 50 percent of the green gap. The coke residue equals about 22 percent of the original weight of the pitch, plus release agent, plus phenanthrene. Such fuel elements are also considered fully acceptable for use in gas-cooled, high-temperature nuclear reactors.

EXAMPLE V

The process of Example I is repeated using 20 weight percent of dimethyl terephthalate instead of the camphor. After firing, the gap measures between 25 percent and 50 percent of the green gap. The coke residue is equal to about 25 percent of the original weight of the pitch, plus release agent, plus coke reducer. Such fuel elements are also considered to be fully acceptable for use in a high-temperature gas-cooled nuclear reactor.

EXAMPLE VI

The process of Example I is repeated except that 10 weight percent of octadeconal is employed and 15 weight percent of polystyrene (Sinclair-Koppers Dylark) is used instead of camphor. The polystryene is added in granular form and becomes thermoplastic at the mixing temperature of 200° C. and is dispersed therethroughout. After in situ carbonization of the green fuel rods, the gap is between 25 percent and 50 percent of the green gap, and the coke residue is about 21 percent of the pitch, octadeconal and polystyrene. Such nuclear fuel elements are considered to be excellently suited for use in high-temperature, gas-cooled nuclear reactors.

EXAMPLE VII

The process of Example I is repeated except that the pitch is employed in an amount of about 32 weight percent, octadeconal in an amount of 10 weight percent and graphite flour in an amount of about 38 weight percent. Instead of using camphor, polyethylene (DuPont Alathon 1560) in granular form is used. After carbonization, the gap is between 25 percent and 50 percent of the green gap, and the coke residue measures about 14 percent of the original weight of the pitch, plus octadeconal, plus polyethylene. Such nuclear fuel elements are considered to be fully acceptable for use in high-temperature, gas-cooled nuclear reactors.

EXAMPLE VIII

The process of Example I is repeated using 37 weight percent pitch, 10 weight percent octadeconal and 38 percent weight graphite flour. Instead of using camphor, 15 weight percent of polypropylene (Hercules Pro-Fax 6523) in granular form is used. After carbonization, the radial gap is between 25 percent and 50 percent of the green gap. The coke residue is about 17 weight percent of the initial weight of pitch, plus octadeconal, plus polypropylene. Such fuel elements are considered to be fully acceptable for use in gas-cooled high temperature nuclear reactors.

Modifications of the invention as would be obvious to one having the ordinary skill in the art are intended to come within the scope of the invention which is defined by the appended claims. Various features of the invention are set forth in the claims which follow.

What is claimed is:

1. A method of making a nuclear fuel element comprising the steps of providing a porous rigid fuel element block of graphite having a cavity of precise dimension formed therein, combining particulate nuclear fuel material having fission-product retentive coatings, particulate carbon, pitch, and a carbonizable coke-reducing additive which is effective to reduce the coke yield upon carbonization, said additive being selected from the group consisting of (1) polystyrene and styrene-butadiene copolymers having a molecular weight between about 500 and 1,000,000, (2) aromatic hydrocarbons having a molecular weight between about 75 and 300, and (3) saturated hydrocarbon polymers having a molecular weight between about 5,000 and 1,000,000, said pitch and said additive being heated to a temperature of at least 100° C., molding a green fuel body from said combination of materials under pressure, inserting said molded green fuel body into said cavity within said fuel element block and heating said molded green body in situ in said fuel element cavity to decompose the pitch and said additive leaving a relatively close-fitting fuel body in said cavity, which fuel body comprises coated nuclear fuel particles plus particulate carbon in a coke matrix formed from said carbonized pitch and additive, wherein said coke constitutes an amount not more than 25 weight percent of the original weight of pitch plus said additive.

2. A method in accordance with claim 1 wherein there is also included a release agent selected from the group consisting of alcohols, fatty acids and amines having a carbon chain length from 12 to 30.

3. A method in accordance with claim 2 wherein pitch constitutes from about 20 to about 75 weight percent, wherein particulate carbon constitutes between about 20 and about 50 weight percent, wherein said coke-reducing additive comprises between about 5 and 50 weight percent, and wherein said release agent comprises between about 2 and about 30 weight percent, said pitch and said coke-reducing additive being present in a ratio between about 2 to 1 and about 0.08 to 1.

4. A method in accordance with claim 1 wherein said additive is an aromatic hydrocarbon having a molecular weight between about 75 and 300.

5. A method in accordance with claim 4 wherein said additive is selected from the group consisting of camphor, naphthalene, anthracene, penanthrene, dimethyl terephthalate and mixtures thereof.

6. A method in accordance with claim 1 wherein said additive is a saturated hydrocarbon polymer having a molecular weight between about 5,000 and 1,000,000.

7. A method in accordance with claim 6 wherein said additive is selected from the group consisting of polyethylene, polypropylene and mixtures thereof.

8. A method in accordance with claim 1 wherein said additive is polystyrene having a molecular weight between about 500 and 1,000,000.

9. A method in accordance with claim 1 wherein said additive is a styrene-butadiene copolymer having a ratio of between 10 to 1 and to 1 to 1, styrene to butadiene.

10. A method of making a nuclear fuel element which method comprises the steps of providing a porous rigid fuel element block of graphite having a cavity of precise dimension formed therein, combining particulate carbon, pitch, a release agent, and a carbonizable coke-reducing additive which is effective to reduce the coke yield upon carbonization, said additive being selected from the group consisting of (1) polystyrene and styrene-butadiene copolymers having a molecular weight between about 500 and 1,000,000, (2) aromatic hydrocarbons having a molecular weight between about 75 and 300, and (3) saturated hydrocarbon polymers having a molecular weight between about 5,000 and 1,000,000, molding a green fuel body by loading a mold cavity with a desired amount of coated nuclear fuel particles, heating said combination of materials to a temperature of at least 100° C., injecting said heated materials into the mold cavity under pressure, and cooling the mold cavity and removing the green fuel body, inserting said molded green fuel body into said cavity within said porous graphite nuclear fuel element block, and heating said molded green body in situ with said graphite block to decompose said pitch and said additive leaving a relatively close-fitting fuel body in the cavity, which fuel body comprises coated nuclear fuel particles plus particulate carbon in a coke matrix formed from said carbonized pitch and additive, wherein said coke constitutes an amount not more than 25 weight percent of the original weight of pitch plus said additive.

* * * * *